(12) United States Patent
Cooper et al.

(10) Patent No.: US 7,401,155 B2
(45) Date of Patent: *Jul. 15, 2008

(54) METHOD AND SYSTEM FOR DOWNLOADING NETWORK DATA AT A CONTROLLED DATA TRANSFER RATE

(75) Inventors: Jeremy S Cooper, Petaluma, CA (US); Michael G Foulger, Novato, CA (US)

(73) Assignee: Archeron Limited LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/758,282

(22) Filed: Jan. 16, 2004

(65) Prior Publication Data

US 2004/0210589 A1  Oct. 21, 2004

Related U.S. Application Data (63) Continuation of application No. 09/552,559, filed on Apr. 19, 2000, now Pat. No. 6,681,255.

(51) Int. Cl.
*G06F 15/16* (2006.01)
(52) U.S. Cl. .................. 709/233; 709/232; 709/235
(58) Field of Classification Search ............... 709/230, 709/231, 232–235
See application file for complete search history.

(56) References Cited

U.S. PATENT DOCUMENTS

| | | | |
|---|---|---|---|
| 5,532,838 A | 7/1996 | Barbari | |
| 5,583,995 A | 12/1996 | Gardner et al. | |
| 5,793,972 A | 8/1998 | Shane | |
| 5,796,952 A | 8/1998 | Davis et al. | |
| 5,808,566 A | 9/1998 | Behr | |
| 5,818,447 A | 10/1998 | Wolf et al. | |
| 5,832,497 A | 11/1998 | Taylor | |
| 5,870,552 A | 2/1999 | Dozier et al. | |
| 5,875,175 A * | 2/1999 | Sherer et al. ................ 370/230 |
| 5,908,465 A | 6/1999 | Ito et al. | |
| 5,933,811 A | 8/1999 | Angles et al. | |
| 5,937,162 A | 8/1999 | Funk et al. | |

(Continued)

FOREIGN PATENT DOCUMENTS

EP   0989501 A2   9/1999

(Continued)

OTHER PUBLICATIONS

IBM Technical Disclosure Bulletin, NN8905154, May 1989, 2 Pages.

(Continued)

*Primary Examiner*—Bunjob Jaroenchonwanit
*Assistant Examiner*—Julian Chang
(74) *Attorney, Agent, or Firm*—Sterne, Kessler, Goldstein & Fox P.L.L.C.

(57) ABSTRACT

A method and system for retrieving web-site based information by a spider engine at a target bandwidth is described. A target band width is received from the spider engine. A wait time is calculated by a timing module. Data retrieval from a web site is delayed by the calculated wait time so that data is retrieved at the desired target bandwidth.

7 Claims, 7 Drawing Sheets

U.S. PATENT DOCUMENTS

| | | | |
|---|---|---|---|
| 5,966,695 A | 10/1999 | Melchione et al. | |
| 5,970,062 A | 10/1999 | Bauchot | |
| 5,978,799 A | 11/1999 | Hirsch | |
| 5,999,912 A | 12/1999 | Wodarz et al. | |
| 6,006,225 A | 12/1999 | Bowman et al. | |
| 6,018,518 A | 1/2000 | Smallwood et al. | |
| 6,049,776 A | 4/2000 | Donnelly et al. | |
| 6,055,510 A | 4/2000 | Henrick et al. | |
| 6,073,075 A | 6/2000 | Kondou et al. | |
| 6,085,244 A | 7/2000 | Wookey | |
| 6,091,777 A * | 7/2000 | Guetz et al. | 375/240.11 |
| 6,094,507 A | 7/2000 | Monden | |
| 6,101,485 A | 8/2000 | Fortenberry et al. | |
| 6,170,071 B1 | 1/2001 | Wheeler | |
| 6,188,396 B1 | 2/2001 | Boezeman et al. | |
| 6,222,825 B1 | 4/2001 | Mangin et al. | |
| 6,233,520 B1 | 5/2001 | Ito et al. | |
| 6,263,020 B1 | 7/2001 | Gardos et al. | |
| 6,275,575 B1 | 8/2001 | Wu | |
| 6,282,540 B1 | 8/2001 | Goldensher et al. | |
| 6,321,265 B1 | 11/2001 | Najork et al. | |
| 6,346,980 B1 | 2/2002 | Tani et al. | |
| 6,351,755 B1 | 2/2002 | Najork et al. | |
| 6,360,254 B1 | 3/2002 | Linden et al. | |
| 6,377,936 B1 | 4/2002 | Henrick et al. | |
| 6,397,219 B2 | 5/2002 | Mills | |
| 6,401,075 B1 | 6/2002 | Mason et al. | |
| 6,449,635 B1 | 9/2002 | Tilden, Jr. et al. | |
| 6,462,676 B1 | 10/2002 | Koizumi | |
| 6,466,940 B1 | 10/2002 | Mills | |
| 6,523,021 B1 | 2/2003 | Monberg et al. | |
| 6,539,080 B1 | 3/2003 | Bruce et al. | |
| 6,549,950 B2 | 4/2003 | Lytle et al. | |
| 6,560,243 B1 * | 5/2003 | Mogul | 370/468 |
| 6,578,002 B1 | 6/2003 | Foulger et al. | |
| 6,587,832 B1 | 7/2003 | Beck et al. | |
| 6,594,666 B1 | 7/2003 | Biswas et al. | |
| 6,618,747 B1 | 9/2003 | Flynn et al. | |
| 6,657,558 B2 | 12/2003 | Horita et al. | |
| 6,662,194 B1 | 12/2003 | Joao | |
| 6,668,281 B1 | 12/2003 | Ayyadurai | |
| 6,681,255 B1 | 1/2004 | Cooper et al. | |
| 6,694,353 B2 | 2/2004 | Sommerer | |
| 6,721,784 B1 | 4/2004 | Leonard et al. | |
| 6,751,606 B1 | 6/2004 | Fries et al. | |
| 6,791,943 B1 * | 9/2004 | Reynolds | 370/232 |
| 6,854,007 B1 | 2/2005 | Hammond | |
| 7,007,010 B2 | 2/2006 | Cooper | |
| 7,065,555 B2 | 6/2006 | Foulger et al. | |
| 2001/0011226 A1 | 8/2001 | Greer et al. | |
| 2001/0039508 A1 | 11/2001 | Nagler et al. | |
| 2001/0042000 A1 | 11/2001 | Defoor Jr. | |
| 2001/0047297 A1 | 11/2001 | Wen | |
| 2001/0054043 A1 | 12/2001 | Harlan | |
| 2002/0004733 A1 | 1/2002 | Addante | |
| 2002/0004753 A1 | 1/2002 | Perkowski | |
| 2002/0016730 A1 | 2/2002 | Foulger et al. | |
| 2002/0016809 A1 | 2/2002 | Foulger et al. | |
| 2002/0073343 A1 | 6/2002 | Ziskind et al. | |
| 2002/0152238 A1 | 10/2002 | Hayes | |
| 2002/0156779 A1 | 10/2002 | Elliott et al. | |
| 2003/0037158 A1 | 2/2003 | Yano et al. | |
| 2003/0046148 A1 | 3/2003 | Rizzi et al. | |
| 2003/0128297 A1 | 7/2003 | Chu | |
| 2003/0145100 A1 * | 7/2003 | Marchetto et al. | 709/233 |
| 2004/0010484 A1 | 1/2004 | Foulger et al. | |
| 2004/0210589 A1 | 10/2004 | Cooper et al. | |
| 2006/0129536 A1 | 6/2006 | Foulger et al. | |
| 2007/0016562 A1 | 1/2007 | Cooper | |
| 2007/0022170 A1 | 1/2007 | Foulger et al. | |
| 2007/0150804 A1 | 6/2007 | Foulger et al. | |
| 2007/0204219 A1 | 8/2007 | Foulger et al. | |

FOREIGN PATENT DOCUMENTS

| | | |
|---|---|---|
| JP | 08221479 A | 8/1996 |
| WO | WO 97/07467 | 2/1997 |
| WO | PCT/US97/19719 A2 | 10/1997 |
| WO | WO 98/20434 | 5/1998 |
| WO | PCT/US97/22151 | 6/1998 |
| WO | WO 98/27696 | 6/1998 |
| WO | WO 00/20975 | 4/2000 |
| WO | WO 00/25508 | 5/2000 |
| WO | WO 01/13069 A1 | 2/2001 |
| WO | WO 01/65426 A1 | 9/2001 |

OTHER PUBLICATIONS

International Search Report for Appl. No. PCT/US01/12648 issued Nov. 21, 2001, 6 Pages.

"What is MD5 and Why Do I Care?" by Lance Spitzner http://www.enteract.com/~/spitz/md5.html downloaded Mar. 20, 2000.

The MD5 Message Digest Algorithm by R. Rivest MIT Laboratory for Computer Science and RSA Data Security, Inc. Apr. 1992.

Applied Cryptography Protocols, Algorithms, and Source Code Inc. Schier, Bruce 1996.

Google Launches Full Site of Fully Automated, Highly Customizable Websearch Services Based on Company's Award-Winning Search Technology Business Wire, p. 0420 Apr. 4, 2000.

RSS Feeds From CNET News.com/CNET News.com http://news.com/2009-1090-980549.html?tag=ne.404 (downloaded May 15, 2006- 3 pgs).

http://www.weather.com/services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998, IEEE, 1060-3425, 1-10.

Jin-gang Kim et al., Intelligent Information Recommend System on the Internet, 1999, IEEE.

Branscum, Deborah "Sites to Help Professional Workers Who Like to Go it Alone", New York Times, Oct. 14, 1999, retrieved Jun. 23, 2005 from Proquest Direct, pp. 1-3.

Houston, Lori, "IC Planet: Running Perl in the Engine", www.oreilly.com Apr. 10, 2000 [retrieved May 23, 2005 from Google.com pp. 1-2].

Clark, Don "E-Business Starting Gate" Wall Street Journal Apr. 24, 2000 [retrieved Jun. 23, 2005 from Proquest Direct pp. 1-3].

Anderson, D., "E-mail or Me-mail?" The Industry Standard, IDG.net, Printed from http://www.thestandard/com/article/display/0,1151,12422,00.html, 4 pages (Mar. 6, 2000). cited by other.

Cross, R. and Nassef, A., "E-Mail Direct Marketing Comes of Age," Direct Marketing, Hoke Communications, vol. 62, No. 6, pp. 44-45 (Oct. 1999). cited by other.

"Top Ten Strategies for Direct Email Success," Boldfish Corporation, Printed from http://www.boldfish.com/BF-emguide/top-ten.html, 7 pages (Jan. 1, 2000). cited by other.

English-Language Abstract of Japanese Patent Publication No. 2000020421, European Patent Office, 1 page (Jan. 21, 2000—Date of publication of application). cited by other.

International Search Report from PCT Application No. PCT/US01/13137, 7 pages, mailed Aug. 28, 2002. cited by other.

International Search Report from Application No. PCT/US01/13141, 7 pages, mailed Oct. 27, 2003.

Sanad et al. Mobile cellular/GPS/satellite antennas with both single - band and dual-band, Antennas and Propagation Society International Symposium, Jul. 16-20, 2000. cited by examiner.

Nagy et al. Geographic Data Processing. ACM Computing Surveys. 1979, pp. 139-181. cited by examiner.

International Search report for Application No. PCT/US01 12510 Apr. 18, 2001, 6 pgs mailed Sep. 5, 2002.

Ju, J and Wang Y., "Scheduling PVM Tasks,"XP000627434, Operating Systems Review (SIGOPS), ACM Headquarter, New York, NY, vol. 30, No. 3, Jul. 1, 1996, pp. 22-31.

"Mental Ray Specification," XP002195542,<http://www.id8media.com/3s_products/mental_ray2.htm>,[internet], retrieved on Apr. 8, 2002.

Taylor, A., "Press Release - Avid Announces New Release of softimage^3d 3.8sp2," XP002195543, <http://www.softimage.com/community/xsi/discuss/ Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746 filed Apr. 18, 2000 entitled "Method, System, and Computer Program Product for Propagating Remotely Configurable Posters of Host Site Content".

* cited by examiner

METHOD AND SYSTEM FOR DOWNLOADING NETWORK DATA AT A CONTROLLED DATA TRANSFER RATE

BACKGROUND OF THE INVENTION

1. Field of the Invention

The present invention is directed to spider engines and, in particular, to regulating the rate of data retrieval by a spider engine.

2. Related Art

"Web crawlers", "robots", or "spider engines" are programs used to automatically search the Internet for web pages or documents of interest. The information found by the spider engine may be collected, cataloged, and otherwise used by search engines. For example, a spider engine may be directed to search for and collect particular types of data, such as product catalog information, or may randomly search and catalog all found web pages to create a web index. The spider engine may enter a particular web site, and search one or more web pages of the web site for information of interest. The web site being searched may maintain a large number of web pages. Hence, searching with a spider engine may entail downloading, via the Internet, hundreds, thousands, and even more pages of information in a relatively short amount of time, from a single web site server.

Searching a web site in this manner with a spider engine may cause a web site server to become heavily loaded with web page requests. A web site server may be physically limited to supporting a particular amount of web page requests at any one time. The loading due to requests from a single spider engine may approach this web page request limit, and impair the web server's ability to respond to other requests for information during this period. This overloading may be detrimental to the web site provider's goal of making information available to interested parties, and may discourage interested parties from visiting the web site because they receive denials of service. Hence, what is needed is a method and system for limiting such web site requests of a web server by a spider engine, while still yielding acceptable search results.

SUMMARY OF THE INVENTION

The present invention prevents a spider engine from overloading a web site with web page requests. The present invention includes a timing module that is coupled to the spider engine. The timing module of the present invention prevents the overloading of a web site server. The timing module monitors data transfer between the web site server and the spider engine, and provides the spider engine with information to adjust the data transfer rate accordingly. The timing module can insert a "wait" state of a calculated length of time between data requests by the spider engine. By controlling this wait time inserted between data requests, the timing module is able to adjust the overall data transfer rate between the web site server and the spider engine to a desired level.

The present invention is directed to a system for retrieving web-site based information using a spider engine at a target bandwidth. A timing module is coupled to or otherwise associated with the spider engine. The timing module includes a data receiver, a bytes accumulator, a current time determiner, a wait time calculator, and a wait time transmitter. The data receiver receives a target bandwidth, $B_T$, and at least one bytes count from the spider engine. The bytes accumulator accumulates the at least one bytes count received from the spider engine to create an aggregate bytes count, $bytes_{AGG}$. The current time determiner determines a start time, $T_{START}$, and current time, $T_{NOW}$, for the at least one received bytes count. The wait time calculator calculates a wait time as a function of $bytes_{AGG}$, $B_T$, and an elapsed time ($T_{NOW}-T_{START}$). The wait time is the amount of time the spider engine should wait to initiate a next web-site data retrieval to reach the target bandwidth. A wait time transmitter transmits the wait time, $T_{WAIT}$, calculated by the wait time calculator to the spider engine.

The present invention is further directed to a method of retrieving web site based information at a target bandwidth. A target bandwidth, $B_T$, is received. The target bandwidth, $B_T$, defines a desired information transfer rate with the web site. A wait time, $T_{WAIT}$, is calculated. Data retrieval from the web site is delayed by the calculated wait time so that the data is retrieved at the desired target bandwidth, $B_T$.

A start time, $T_{START}$, is calculated. Retrieval of data is initiated from a remote web-site across a network. A number of bytes received is detected. An aggregate bytes count, $bytes_{AGG}$, is incremented by the number of bytes received. A current time, $T_{NOW}$, is calculated. The wait time, $T_{WAIT}$, is calculated. $T_{WAIT}$ may be calculated according to the equation:

$$T_{WAIT}=(bytes_{AGG})/B_T-(T_{NOW}-T_{START})$$

Further features and advantages of the invention as well as the structure and operation of various embodiments of the present invention are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

The present invention prevents a spider engine from overloading a web site with web page requests. The present invention includes a timing module that is coupled to the spider engine. The timing module of the present invention prevents the overloading of a web site server. The timing module monitors data transfer between the web site server and the spider engine, and provides the spider engine with information to adjust the data transfer rate accordingly. The timing module can insert a "wait" state of a calculated length of time between data requests by the spider engine. By controlling this wait time inserted between data requests, the timing module is able to adjust the overall data transfer rate between the web site server and the spider engine to a desired level.

The timing module of the present invention causes the spider module to wait for a calculated amount of time after a data request before making a subsequent data request. This adjusts the overall data transfer bandwidth or rate to a desired level. For instance, the timing module may adjust the transfer rate to mimic that of an average user accessing a web site via a commercial computer modem. This includes any commercial computer modem transfer rates, such as 14.4, 28.8, 56, or 128 Kbits/sec. The timing module may also adjust the transfer bandwidth to equal any percentage of the maximum transfer rate over time. This could include 5%, 10%, 20%, or any other rate. According to the present invention, it is feasible to increase transfer rates during off-peak hours, such as overnight, to approach the maximum transfer rate, for instance, but decrease the rate during regular business hours.

A template is coupled to the spider engine that provides useful information to the spider engine related to a search. The template can be written in a description language, for example. The template determines for the spider engine: what data to search for, where the data resides (location information), the nature of the data, and what to do with the data. For instance, the location information may include the location of data within a particular web page, and the location of data in a particular web site, or the like.

The spider engine with timing module of the present invention may search for any type of web site-based data and documentation. In an embodiment, the spider engine searches for web pages that represent resumes. A template used for searching resumes by the spider engine can include codes and descriptors for fields of information that would be found in resumes. These fields include "subject", "objective", "work history", "education", and any other applicable fields. A particular resume can include these fields in a single document on a single web page, or may be divided among multiple web pages. These fields in the template assist the spider engine in recognizing resume documents, and determining what resume data is to be retrieved.

System Level Description

Figure 1:
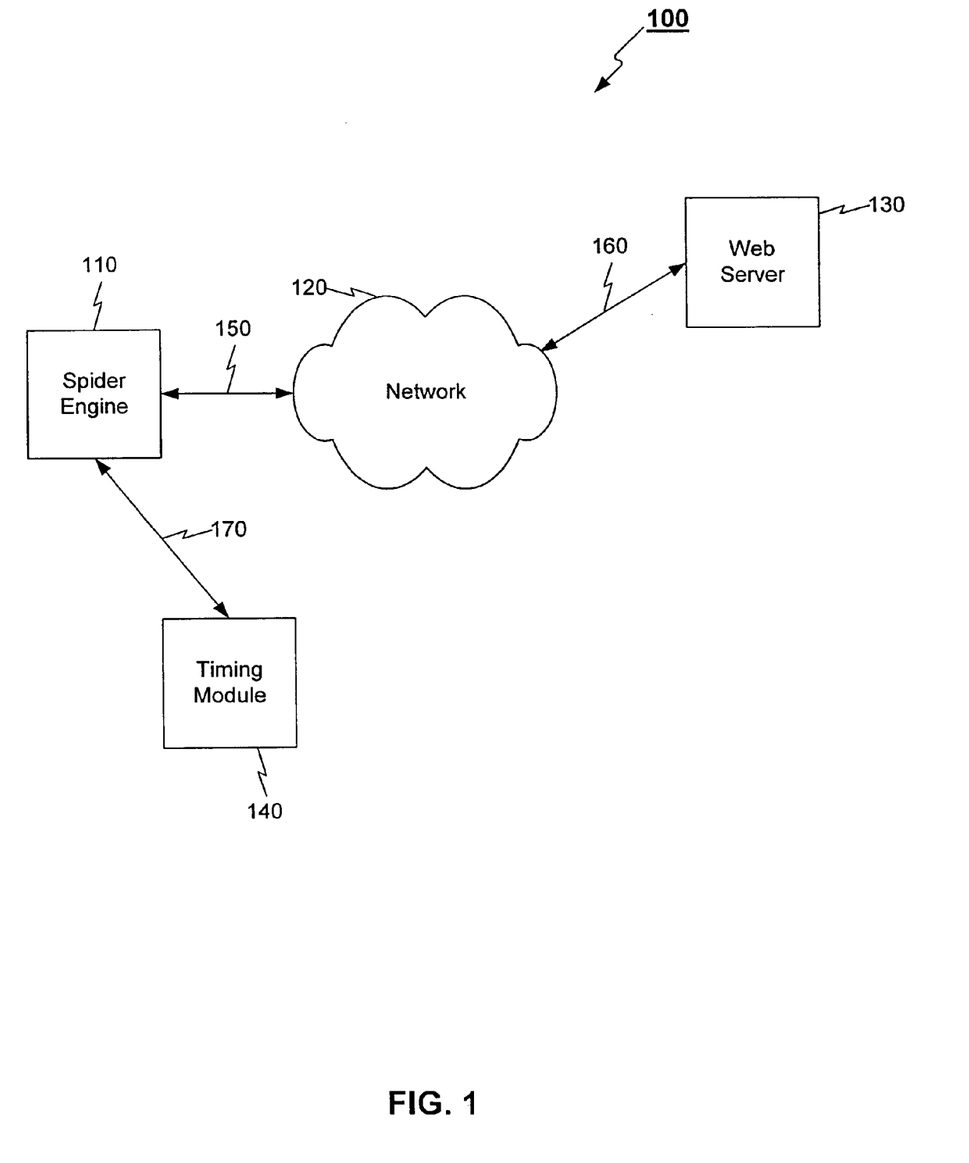
FIG. 1 illustrates an exemplary computer network according to the present invention.

FIG. 1 illustrates an exemplary computer network 100, according to embodiments of the present invention. Computer network 100 includes a spider engine 110, a network 120, a web server 130, and a timing module 140.

Spider engine 110 can be any spider engine known to persons skilled in the relevant art(s) from the teachings herein. For instance, the present invention is adaptable to both "indexing" and "directed" spider engines, and any other spider engine type.

Figure 7:
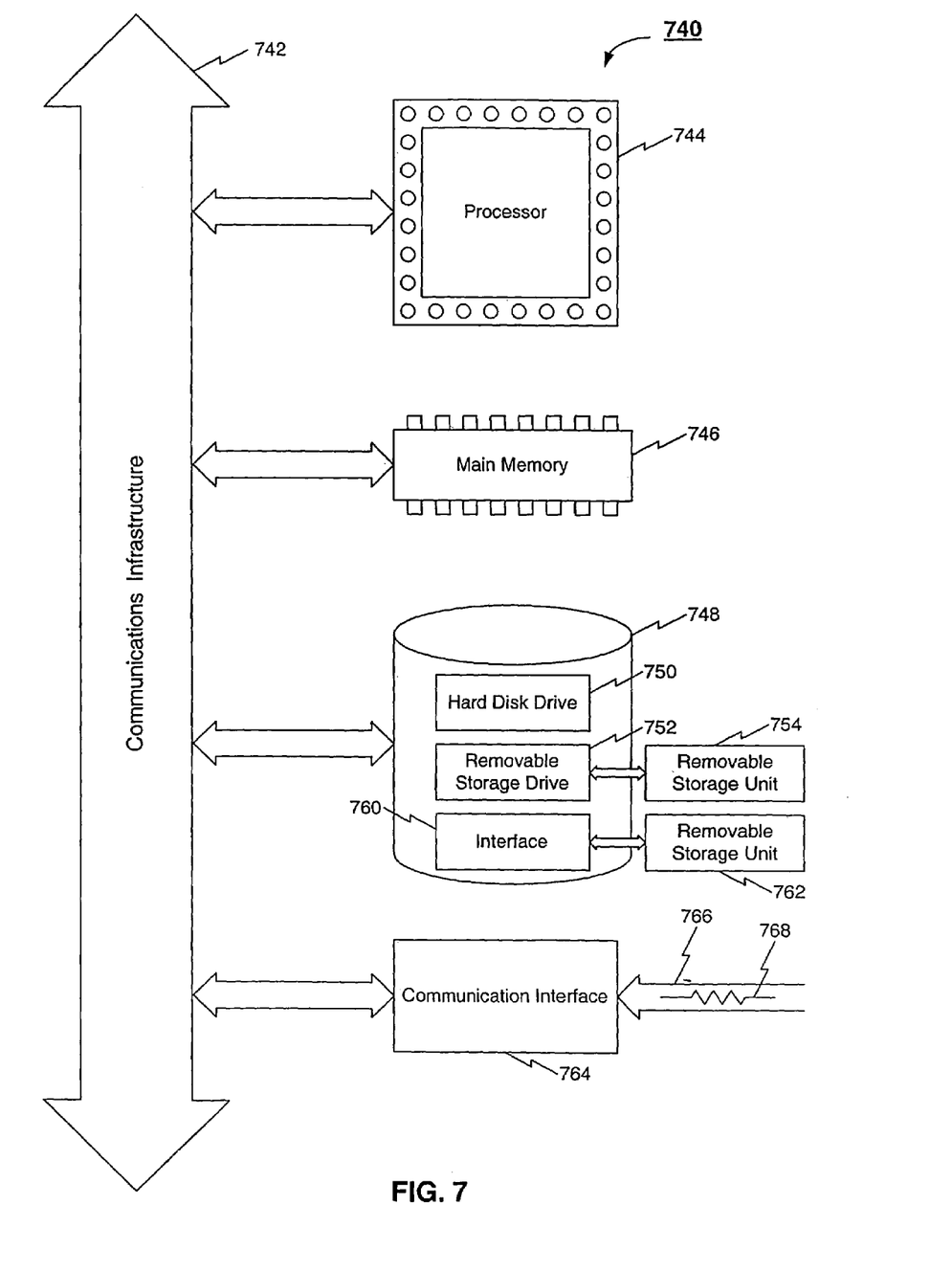
FIG. 7 is a block diagram of a computer system according to an example implementation of the present invention.

In an embodiment, spider engine 110 creates an instance of timing module 140 when needed. In alternative embodiments, timing module 140 is generated independently of its associated spider engine 110. Spider engine 110 may create multiple instances of timing module 140 corresponding to data transfer between multiple web servers 130. Timing module 140 can be implemented in software, hardware, or firmware, or any combination thereof. For instance, timing module 140 can be implemented as a software module running on a computer system that is also running spider engine 110. An example suitable computer system 740 for running timing module 140 is shown in FIG. 7, and is more fully described below.

Spider engine 110 is coupled to timing module 140 via data link 170. Data link 170 can be any data or communications link known to persons skilled in the relevant art(s) from the teachings herein. Various suitable communication links are described below in relation to FIGS. 5-7.

Spider engine 110 is coupled to network 120 via first communications link 150. First communications link 150 can be any suitable communications link for interfacing a computer system or other hardware with a network, such as network 120, as would be apparent to persons skilled in the relative art(s) from the teachings herein.

Figure 5:
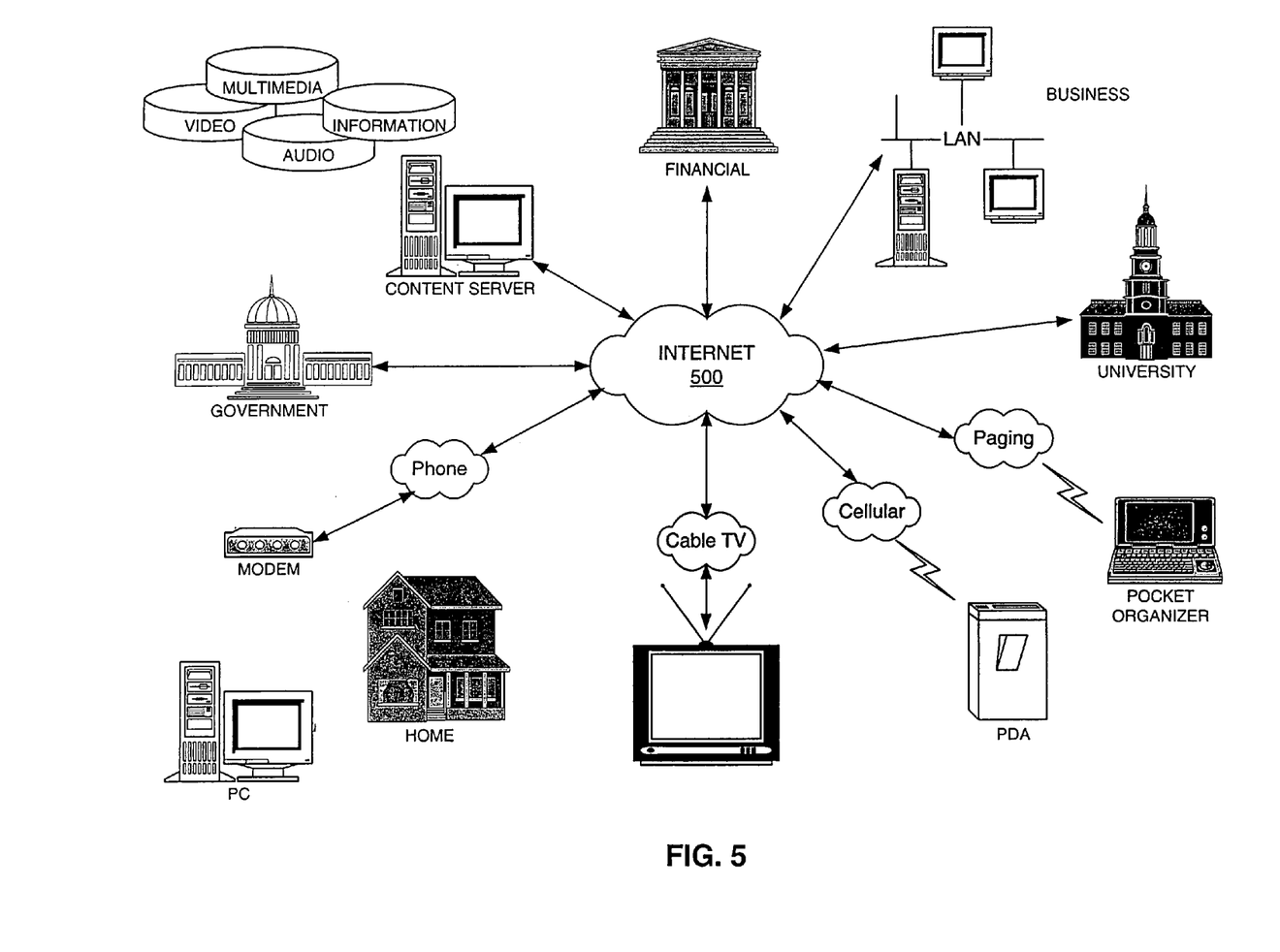
FIG. 5 is a diagram of an example Internet environment according to the present invention.

Network 120 can be any communications network known to persons skilled in the relevant art(s) from the teachings herein. For instance, network 120 can be a network such as a local area network (LAN), an intranet, or the Internet. Examples embodiments for network 120 are further described herein. An example network 120 can include an Internet 500, which is illustrated in FIG. 5 as described more fully below.

Web server 130 is coupled to network 120 via second communications link 160. Web server 130 can be any computer system that delivers or serves web pages. Web server 130 has an IP address and possibly a domain name. Web server 130 includes server software. Suitable computer systems for web server 130 would be apparent to a person skilled in the relevant art.

Second communications link 160 can be any suitable communications link for interfacing a web server or other hardware with a network, such as network 120, as would be recognized by persons skilled in the relative art(s) from the teachings herein. Various suitable communication links for first and second communications links 150 and 160 are described below in relation to FIGS. 5-7.

Description in these terms is provided for convenience only. It is not intended that the invention be limited to application in this example network environment. In fact, after reading the following description, it will become apparent to a person skilled in the relevant art how to implement the invention in alternative environments known now or developed in the future.

Timing Module

Figure 3:
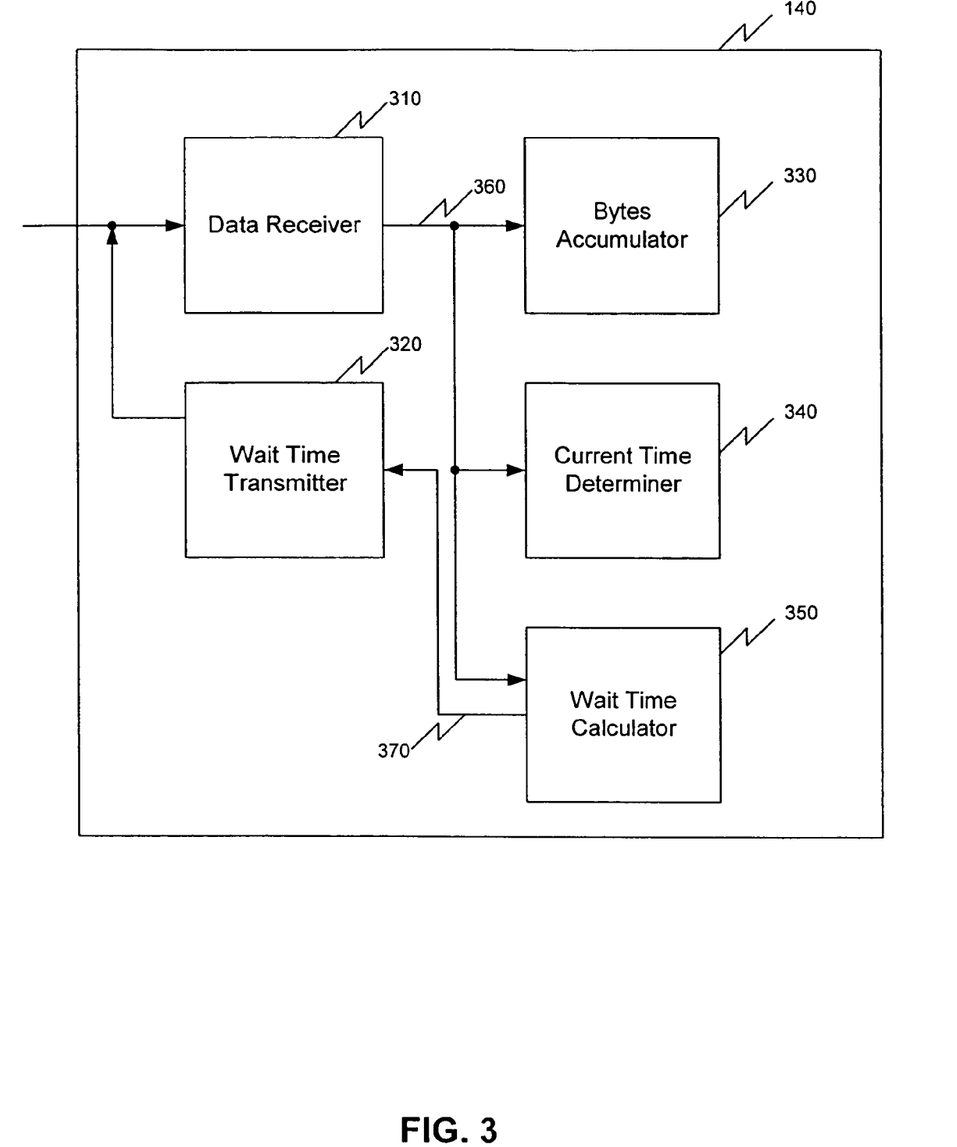
FIG. 3 illustrates an exemplary timing module, according to an embodiment of the present invention.

FIG. 3 illustrates an example timing module 140, according to an embodiment of the present invention. Timing module 140 comprises a data receiver 310, a wait time transmitter 320, a bytes accumulator 330, a current time determiner 340, and a wait time calculator 350.

Data receiver 310 receives data from spider engine 110. This data can include a target bandwidth, $B_T$, and one or more received bytes counts, for example. The target bandwidth, $B_T$, is equal to the bandwidth at which data transfer between spider engine 110 and web server 130 is desired to operate. In an alternative embodiment, $B_T$, is not received, but is hardwired, made software programmable, or is otherwise set in wait time calculator 350. When spider engine 110 engages in data transfer between multiple web sites simultaneously, a target bandwidth may be received or set for each web site. A received bytes count is equal to the amount of data that spider engine 110 receives in response to a particular request for data. Data receiver 310 can also receive requests from spider engine 110 for timing module 140 to supply it with a wait time, $T_{WAIT}$. The wait time, $T_{WAIT}$, is the amount of time that timing module 140 has calculated for spider engine 110 to wait before making a subsequent data request, to maintain the target data transfer bandwidth, $B_T$.

Bytes accumulator 330 maintains a running bytes count total of received bytes counts, to create an aggregate bytes count, $bytes_{AGG}$. The running bytes count total is maintained on a per-site basis. Bytes accumulator 330 can maintain separate bytes counts for data transfers occurring simultaneously between multiple web site servers and spider engine 110. The bytes count for a particular web site server is cleared before the first request for data, when determining a new wait time.

Current time determiner 340 determines a time at which a particular data request begins, start time $T_{START}$, and a time when the bytes count is received for that data request, $T_{NOW}$. Current time determiner 340 can also determine the time at which a last of a series of bytes counts are received.

Wait time calculator 350 calculates an amount of time spider engine 110 should wait to next initiate web-site data retrieval from a particular web site, to reach the target bandwidth, $B_T$, for that web site. In embodiments, the wait time, $T_{WAIT}$, is calculated as a function of $bytes_{AGG}$, $B_T$, and an elapsed time $(T_{NOW}-T_{START})$. In an embodiment, $T_{WAIT}$ is calculated according to the following equation:

$$T_{WAIT}=(bytes_{AGG})/B_T-(T_{NOW}-T_{START}).$$

Wait time transmitter 320 transmits the calculated wait time, $T_{WAIT}$, that is calculated by wait time calculator 350 to spider engine 110.

The timing module of the present invention is not limited to these implementations. The timing module as described in this section can be achieved using any number of structural implementations, including hardware, firmware, software, or any combination thereof. The details of such structural implementations will be apparent to persons skilled in the relevant art(s) based on the teachings contained herein.

Operation

Exemplary operational and/or structural implementations related to the structure(s), and/or embodiments described above are presented in this section (and its subsections). These components and methods are presented herein for purposes of illustration, and not limitation. The invention is not limited to the particular examples of components and methods described herein. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 2:
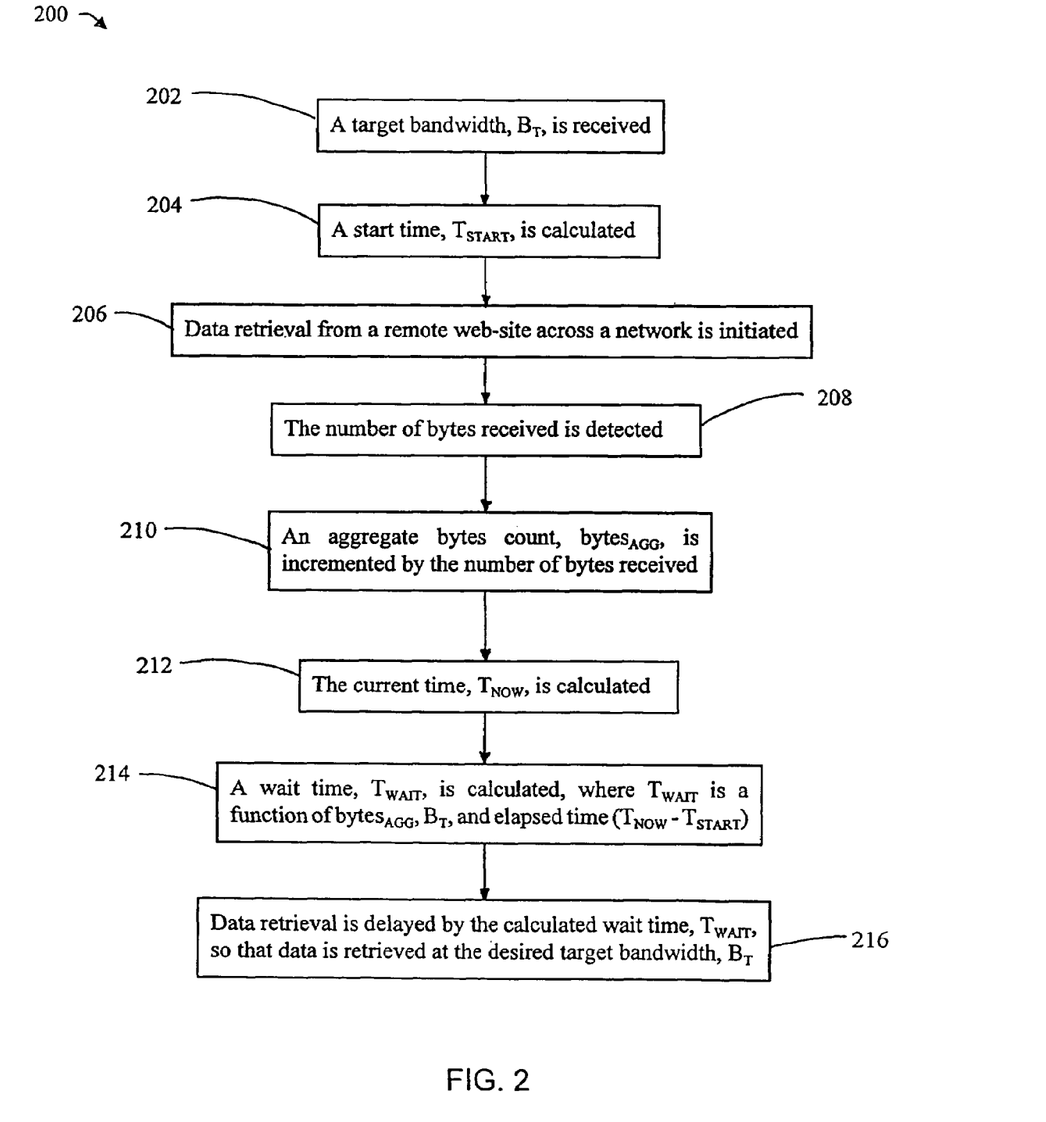
FIG. 2 is a flowchart illustrating a sequence of operation according to an embodiment of the present invention.

FIG. 2 shows a flowchart providing detailed operational steps of an example embodiment of the present invention. The steps of FIG. 2 can be implemented in hardware, firmware, software, or a combination thereof. For instance, the steps of FIG. 2 can be apportioned between spider engine 110 and timing module 140, or can be wholly implemented by either one of spider engine 110 and timing module 140. Alternatively, the steps of FIG. 2 can be implemented by a single entity. Furthermore, the steps of FIG. 2 do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 202. In step 202, a target bandwidth, $B_T$, is received. The target bandwidth, $B_T$, defines a desired data transfer rate with a web site, for example. As discussed herein, multiple target bandwidth values may be received, corresponding to multiple web sites. In step 204, a start time, $T_{START}$, is calculated. The start time defines the time at which data transfer is begun. Next, in step 206, retrieval of data from a remote web-site across a network is initiated. In step 208, a number of bytes received is detected. The bytes are received from the requested web server.

In step 210, an aggregate bytes count, $bytes_{AGG}$, is incremented by the number of bytes received. In embodiments where retrieval of data occurs more than once before calculating a wait time, step 210 includes the steps of incrementing the aggregate bytes count, $bytes_{AGG}$, by the number of bytes received, and returning to step 206.

In step 212, a current time, $T_{NOW}$, is calculated. The current time, $T_{NOW}$, is equal to the time that the requested data is received. Next, in step 214, a wait time, $T_{WAIT}$, is calculated. In an embodiment, $T_{WAIT}$ is a function of $bytes_{AGG}$, $B_T$, and an elapsed time $(T_{NOW}-T_{START})$. In an embodiment, $T_{WAIT}$ is calculated according to the equation:

$$T_{WAIT}=(bytes_{AGG})/B_T-(T_{NOW}-T_{START})$$

In step 216, data retrieval is delayed by the calculated wait time so that data is retrieved at the desired target bandwidth, $B_T$.

Figure 4:
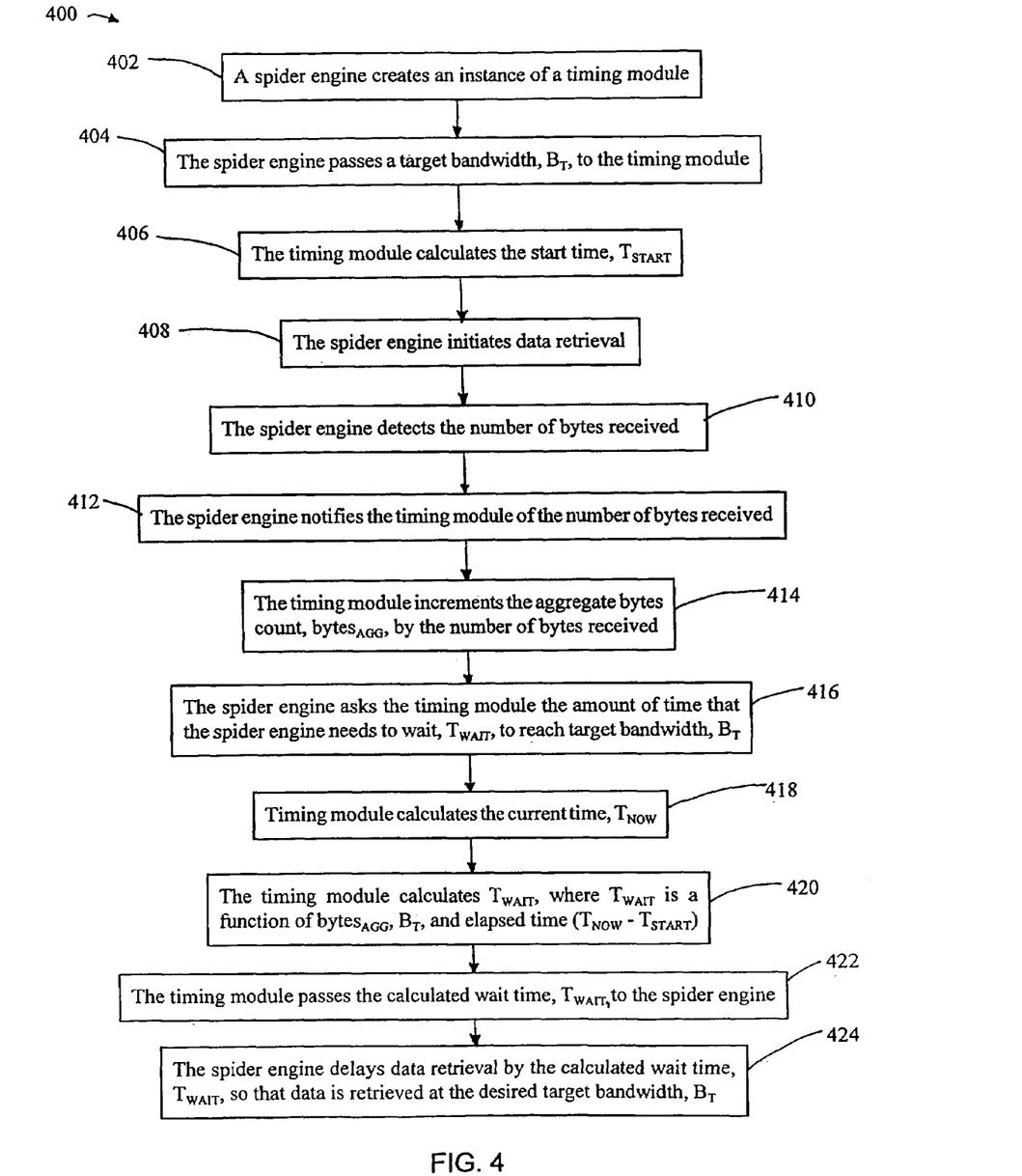
FIG. 4 is a flowchart illustrating a sequence of operation according to an embodiment of the present invention.

FIG. 4 illustrates a flowchart providing an operational embodiment for implementing the present invention with a spider engine and timing module, such as spider engine 110 and timing module 140 of FIG. 1. The steps of FIG. 4 can be implemented in hardware, firmware, software, or a combination thereof. Furthermore, the steps of FIG. 4 do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 402. In step 402, a spider engine creates an instance of a timing module. As described herein, multiple instances of a timing module may be created to accommodate data transfer with multiple web servers.

In step 404, the spider engine passes a target bandwidth, $B_T$, to the timing module. As discussed herein, multiple target bandwidth values can be set or passed from the spider module, corresponding to multiple timing modules and multiple web servers. In step 406, the timing module calculates a start time, $T_{START}$. A start time is calculated for initiation of communication with each web server. Next, in step 408, the spider engine initiates data retrieval. The spider engine can initiate data retrieval from more than one web server. Then, in step 410, the spider engine detects the number of bytes received from a particular web server. Next, in step 412, the spider engine notifies the timing module of the number of bytes received.

In step 414, the timing module increments an aggregate bytes count, $bytes_{AGG}$, by the number of bytes received. The aggregate bytes count that is incremented corresponds to the particular web server from which data is received.

In step 416, the spider engine asks the timing module for the amount of time that the spider engine needs to wait, $T_{WAIT}$, to reach the target bandwidth, $B_T$, for the corresponding web server.

In step 418, the timing module calculates the current time, $T_{NOW}$.

In step 420, the timing module calculates $T_{WAIT}$, where $T_{WAIT}$ is a function of $bytes_{AGG}$, $B_T$, and elapsed time $(T_{NOW}-T_{START})$. In step 422, the timing module passes the calculated wait time, $T_{WAIT}$, to the spider engine.

In step 424, the spider engine delays data retrieval by the calculated wait time, $T_{WAIT}$, so that data is retrieved at the desired target bandwidth, $B_T$.

These embodiments are provided for purposes of illustration, and are not intended to limit the invention. Alternate embodiments, differing slightly or substantially from those described herein, will be apparent to persons skilled in the relevant art(s) based on the teachings contained herein.

Example Network Environment

The present invention can be implemented in conjunction with any communication network, such as the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java 1.1. Java-enabled browsers are used, such as, Netscape, Hotjava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description.

FIG. 5 is a diagram of an example internetwork environment according to the present invention. FIG. 5 shows a communication network or combination of networks (Internet) 500, which can support the invention. Internet 500 consists of interconnected computers that support communication between many different types of users including businesses, universities, individuals, government, and financial institutions. Internet 500 supports many different types of communication links implemented in a variety of architectures. For example, voice and data links can be used including phone, paging, cellular, and cable TV (CATV) links. Terminal equipment can include local area networks, personal computers with modems, content servers of multi-media, audio, video, and other information, pocket organizers, Personal Data Assistants (PDAs), and set-top boxes.

Figure 6:
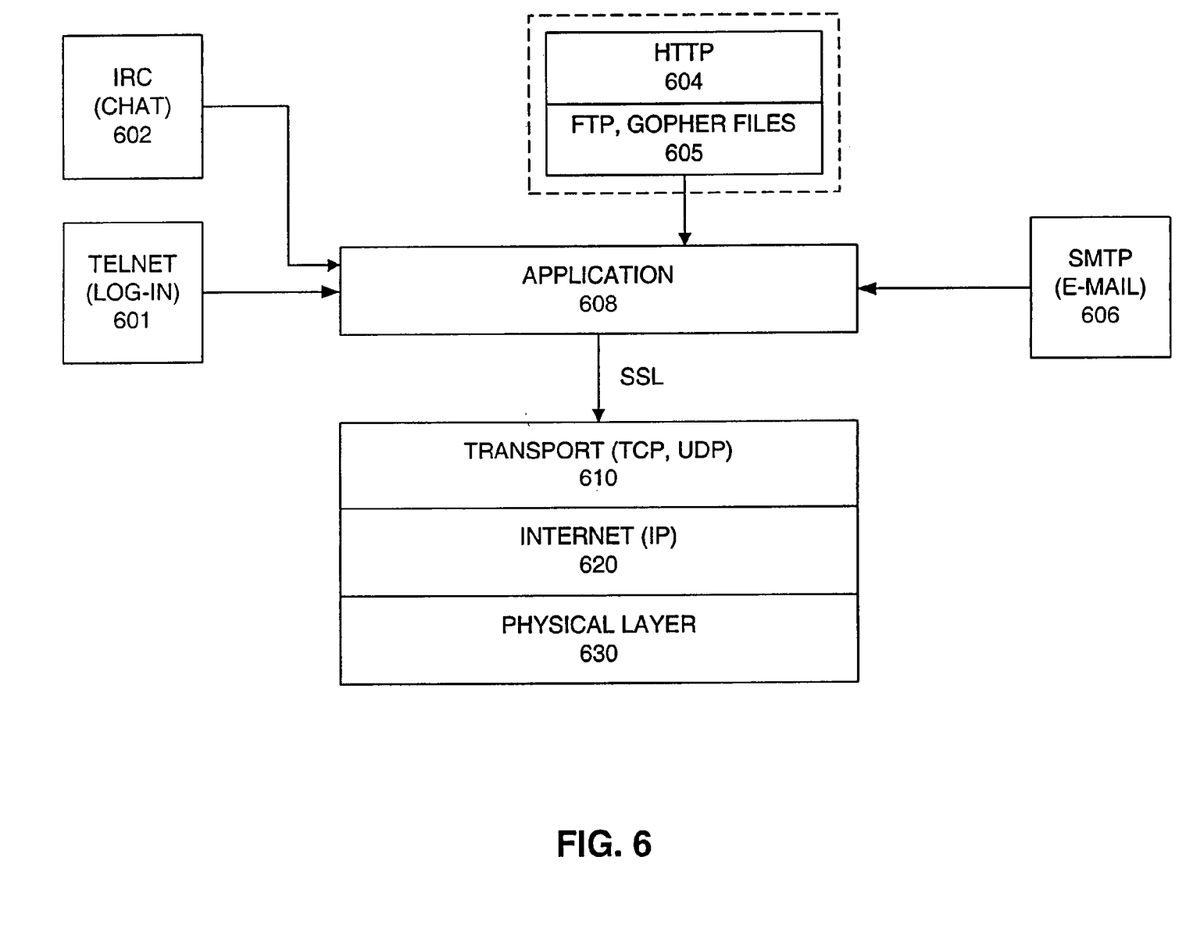
FIG. 6 shows a simplified four-layered communication model supporting Web commerce.

Communication over a communication network, such as Internet 500, is carried out through different layers of communication. FIG. 6 shows a simplified four-layered communication model supporting Web commerce including an application layer 608, transport layer 610, Internet layer 620, physical layer 630. As would be apparent to a person skilled in the art, in practice, a number of different layers can be used depending upon a particular network design and communication application. Application layer 608 represents the different tools and information services which are used to access the information over the Internet. Such tools include, but are not limited to, telnet log-in service 601, IRC chat 602, Web service 603, and SMTP (Simple Mail Transfer Protocol) electronic mail service 606. Web service 603 allows access to HTTP documents 604, and FTP and Gopher files 605. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

Example Computer System

An example of a computer system 740 is shown in FIG. 7. The computer system 740 represents any single or multi-processor computer. Single-threaded and multi-threaded computers can be used. Unified or distributed memory systems can be used.

Computer system 740 includes one or more processors, such as processor 744. One or more processors 744 can execute software implementing routine 400 as described above. Each processor 744 is connected to a communication infrastructure 742 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 740 also includes a main memory 746, preferably random access memory (RAM), and can also include a secondary memory 748. The secondary memory 748 can include, for example, a hard disk drive 750 and/or a removable storage drive 752, representing a floppy disk drive, a magnetic tape drive, an optical disk drive, etc. The removable storage drive 752 reads from and/or writes to a removable storage unit 754 in a well known manner. Removable storage unit 754 represents a floppy disk, magnetic tape, optical disk, etc., which is read by and written to by removable storage drive 752. As will be appreciated, the removable storage unit 754 includes a computer usable storage medium having stored therein computer software and/or data.

In alternative embodiments, secondary memory 748 can include other similar means for allowing computer programs or other instructions to be loaded into computer system 740. Such means can include, for example, a removable storage unit 762 and an interface 760. Examples can include a program cartridge and cartridge interface (such as that found in video game devices), a removable memory chip (such as an EPROM, or PROM) and associated socket, and other removable storage units 762 and interfaces 760 which allow software and data to be transferred from the removable storage unit 762 to computer system 740.

Computer system 740 can also include a communications interface 764. Communications interface 764 allows software and data to be transferred between computer system 740 and external devices via communications path 766. Examples of communications interface 764 can include a modem, a network interface (such as Ethernet card), a communications port, etc. Software and data transferred via communications interface 764 are in the form of signals which can be electronic, electromagnetic, optical or other signals capable of being received by communications interface 764, via communications path 766. Note that communications interface 764 provides a means by which computer system 740 can interface to a network such as the Internet.

The present invention can be implemented using software running (that is, executing) in an environment similar to that described above with respect to FIG. 5. In this document, the term "computer program product" is used to generally refer to removable storage drive 752, a hard disk installed in hard disk drive 750, or a carrier wave carrying software over a communication path 766 (wireless link or cable) to communication interface 764. A computer useable medium can include magnetic media, optical media, or other recordable media, or media that transmits a carrier wave or other signal. These computer program products are means for providing software to computer system 740. For instance, in embodiments, spider engine 110 and timing module 140 are implemented as computer programs. Furthermore, the example modules of timing module 140, shown in FIG. 3, may be implemented as one or more separate computer programs.

Computer programs (also called computer control logic) are stored in main memory 746 and/or secondary memory 748. Computer programs can also be received via communications interface 764. Such computer programs, when executed, enable the computer system 740 to perform the features of the present invention as discussed herein. In particular, the computer programs, when executed, enable the processor 744 to perform the features of the present invention. Accordingly, such computer programs represent controllers of the computer system 740.

The present invention can be implemented as control logic in software, firmware, hardware or any combination thereof. In an embodiment where the invention is implemented using software, the software may be stored in a computer program product and loaded into computer system 740 using removable storage drive 752, hard drive 750, or interface 760. Alternatively, the computer program product may be downloaded to computer system 740 over communications path 766. The control logic (software), when executed by the one or more processors 744, causes the processor(s) 744 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of retrieving data over a network at a target bandwidth, $B_T$, comprising:

(1) transmitting a request for data to a server over the network;

(2) receiving the data from the server over the network;

(3) calculating a wait time based on the target bandwidth and an aggregate bytes count, $bytes_{AGG}$, wherein $bytes_{AGG}$ is an aggregate number of bytes received from the server, and wherein step (3) includes (A) determining a start time, $T_{START}$, based on the request for data of step (1), (B) incrementing the aggregate bytes count, $bytes_{AGG}$, by the number of bytes received in step (2), (C) determining a current time, $T_{NOW}$, and (D) calculating the wait time according to the equation $$\text{wait time} = (bytes_{AGG})/B_T - (T_{NOW} - T_{START});$$

(4) waiting the calculated wait time;

(5) transmitting a request for additional data to the server over the network after step (4); and (6) receiving the additional data from the server over the network.

2. The method of claim 1, further comprising:

(7) repeating steps (4)-(6) for further additional data until all desired data is retrieved from the server over the network.

3. The method of claim 1, wherein step (3) further includes (E) repeating steps (1) and (2) a plurality of times for additional data;

wherein step (B) includes incrementing the aggregate bytes count, $bytes_{AGG}$, by the number of bytes received in each step (2).

4. A computer system, comprising:

transmitting means for transmitting requests for data to a server over a network;

receiving means for receiving said data from said server over said network; and a timing module that calculates a wait time based on an aggregate bytes count, $bytes_{AGG}$, and a target bandwidth, $B_T$, at which rate data is desired to be retrieved from said server over said network, wherein $bytes_{AGG}$ is an aggregate number of bytes received from said server;

wherein said transmitting means delays transmitting requests for data to said server over said network by said calculated wait time;

wherein said timing module determines a start time, $T_{START}$, corresponding to when said transmitting means transmits a request for data to said server over said network;

wherein said timing module detects a number of bytes received by said receiving means due to a transmitted request;

wherein said timing module increments said aggregate bytes count, $bytes_{AGG}$, by said number of bytes received;

wherein said timing module determines a current time, $T_{NOW}$, after at least one iteration of said timing module detecting a number of bytes received by said receiving means due to a transmitted request; and wherein said timing module calculates said wait time according to the equation $$\text{wait time} = (bytes_{AGG})/B_T - (T_{NOW} - T_{START}).$$

5. The computer system of claim 4, wherein said network is the Internet.

6. A computer program product comprising a tangible computer usable storage medium having computer program logic recorded thereon for enabling a processor to retrieve data over a network at a target bandwidth, $B_T$, comprising:

calculating means for enabling a processor to calculate a wait time based on an aggregate bytes count, $bytes_{AGG}$, and a target bandwidth, $B_T$, at which rate data is desired to be retrieved from a server over said network, wherein $bytes_{AGG}$ is an aggregate number of bytes received from said server; and delaying means for enabling a processor to delay transmitting requests for data to said server over said network by said calculating wait time;

determining means for enabling a processor to determine start time, $T_{START}$, corresponding to when a request for data is transmitted to said server over said network;

detecting means for enabling a processor to detect a number of bytes received due to a transmitted request;

incrementing means for enabling a processor to increment said aggregate bytes count, bytes$_{AGG}$, said number of bytes received; and determining means for enabling a processor to determine a current time, T$_{NOW}$, after at least one iteration of detecting a number of bytes received due to a transmitted request;

wherein calculating means enables a processor to calculate said wait time according to the equation $$\text{wait time} = (\text{bytes}_{AGG})/B_T - (T_{NOW} - T_{START}).$$

7. The computer program product of claim 6, wherein the network is the Internet.

* * * * *